(12) United States Patent
Toyama et al.

(10) Patent No.: US 9,136,029 B2
(45) Date of Patent: Sep. 15, 2015

(54) SCINTILLATOR PANEL, AND RADIOGRAPHIC IMAGE SENSOR

(75) Inventors: Shintaro Toyama, Hamamatsu (JP); Yutaka Kusuyama, Hamamatsu (JP); Masanori Yamashita, Hamamatsu (JP); Hirotake Osawa, Hamamatsu (JP); Munenori Shikida, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 190 days.

(21) Appl. No.: 13/643,384

(22) PCT Filed: May 16, 2011

(86) PCT No.: PCT/JP2011/061227
§ 371 (c)(1),
(2), (4) Date: Oct. 25, 2012

(87) PCT Pub. No.: WO2011/152195
PCT Pub. Date: Dec. 8, 2011

(65) Prior Publication Data
US 2013/0043397 A1    Feb. 21, 2013

(30) Foreign Application Priority Data
Jun. 4, 2010   (JP) ................................. 2010-129077

(51) Int. Cl.
G01T 1/20   (2006.01)
G21K 4/00   (2006.01)
G01T 1/202  (2006.01)
G01T 3/06   (2006.01)

(52) U.S. Cl.
CPC ... *G21K 4/00* (2013.01); *G01T 1/20* (2013.01); *G01T 1/202* (2013.01); *G01T 1/2006* (2013.01); *G01T 3/06* (2013.01)

(58) Field of Classification Search
CPC .......... G01T 1/2006; G01T 1/202; G01T 3/06
USPC ...................................................... 250/361 R
See application file for complete search history.

(56) References Cited

U.S. PATENT DOCUMENTS

| | | | |
|---|---|---|---|
| 4,380,702 A | 4/1983 | Takahashi et al. | |
| 5,179,284 A | 1/1993 | Kingsley et al. | |
| 6,762,420 B2 * | 7/2004 | Homme et al. | 250/483.1 |
| 6,781,131 B2 * | 8/2004 | Kusuyama et al. | 250/368 |
| RE40,291 E * | 5/2008 | Homme et al. | 250/370.11 |

(Continued)

FOREIGN PATENT DOCUMENTS

| | | |
|---|---|---|
| CN | 1309777 | 8/2001 |
| EP | 1 349 177 | 10/2003 |

(Continued)

*Primary Examiner* — Christine Sung
(74) *Attorney, Agent, or Firm* — Drinker Biddle & Reath LLP

(57) ABSTRACT

A scintillator panel 1 and a radiation image sensor 10 in which characteristics can be changed easily at the time of manufacture are provided. The scintillator panel 1 comprises a scintillator 3 having an entrance surface 3a for a radiation; a FOP 2, arranged on an opposite side of the scintillator 3 from the entrance surface 3a, for transmitting the light generated by the scintillator 3; and a resin layer 5, formed from a resin containing a color material on the entrance surface 3a side of the scintillator 3, for performing at least one of absorption and reflection of the light generated by the scintillator 3.

16 Claims, 8 Drawing Sheets

(56) References Cited

U.S. PATENT DOCUMENTS

| | | | |
|---|---|---|---|
| 7,473,903 B2 * | 1/2009 | DeJule et al. | 250/370.11 |
| RE42,281 E * | 4/2011 | Homme | 250/483.1 |
| 2002/0079458 A1 | 6/2002 | Zur | |
| 2007/0069141 A1 | 3/2007 | Nittoh et al. | |
| 2009/0032718 A1 * | 2/2009 | Nittoh et al. | 250/367 |
| 2011/0017911 A1 * | 1/2011 | Flamanc et al. | 250/361 R |

FOREIGN PATENT DOCUMENTS

| | | |
|---|---|---|
| JP | 55-163500 A | 12/1980 |
| JP | 56-012600 A | 2/1981 |
| JP | 5-039558 A | 2/1993 |
| JP | 5-196742 A | 8/1993 |
| JP | 9-297181 A | 11/1997 |
| JP | 2000-009847 A | 1/2000 |
| JP | 2000-284053 A | 10/2000 |
| JP | 2004-239713 | 8/2004 |
| JP | 2004-239731 A | 8/2004 |
| JP | 2005-338067 A | 12/2005 |
| JP | 4156709 B2 | 9/2008 |
| JP | 2008-251211 A | 10/2008 |
| WO | WO-99/66346 A1 | 12/1999 |
| WO | WO 2007/134914 | 11/2007 |
| WO | WO-2010/010725 A1 | 1/2010 |

* cited by examiner

SCINTILLATOR PANEL, AND RADIOGRAPHIC IMAGE SENSOR

TECHNICAL FIELD

The present invention relates to a scintillator panel and a radiation image sensor which are utilized for detecting a radiation.

BACKGROUND ART

As a scintillator panel utilized for detecting a radiation, one disclosed in Patent Literature 1 has conventionally been known. Patent Literature 1 discloses a scintillator panel comprising a fiber optics plate which transmits light therethrough, a scintillator formed on the fiber optics plate, a first poly(p-xylylene) film covering the scintillator, an Al (aluminum) film formed on the first poly(p-xylylene) film, and a second poly(p-xylylene) film formed on the Al film.

CITATION LIST

Patent Literature

Patent Literature 1: Japanese Patent Application Laid-Open No. 2005-338067
Patent Literature 2: Japanese Patent Publication No. 5-39558
Patent Literature 3: Japanese Patent Application Laid-Open No. 2004-239713
Patent Literature 4: Japanese Patent Application Laid-Open No. 2000-9847
Patent Literature 5: Japanese Patent Publication No. 4156709
Patent Literature 6: International Publication No. 99/66346
Patent Literature 7: Japanese Patent Application Open No. 9-297181
Patent Literature 8: Japanese Patent Application Laid-Open No. 55-163500
Patent Literature 9: Japanese Patent Application Laid-Open No. 56-12600

Technical Problem

However, scintillator panels such as the one mentioned above have been problematic in that their characteristics such as optical output and resolution cannot be changed easily at the time of manufacture because of their structures. Therefore, an enormous cost is incurred when newly designing a scintillator panel having characteristics in conformity to demands of a client.

In view of such circumstances, it is an object of the present invention to provide a scintillator panel and a radiation image sensor in which characteristics can be changed easily at the time of manufacture.

Solution to Problem

The scintillator panel comprises a scintillator having an entrance surface for a radiation; a fiber optics plate, arranged on an opposite side of the scintillator from the entrance surface, for transmitting the light generated by the scintillator; and a resin layer, formed from a resin containing a color material on the entrance surface side of the scintillator, for performing at least one of absorption and reflection of the light generated by the scintillator.

This scintillator panel can change the light reflectance and absorptance in the resin layer by varying the color material constituting the resin layer, so that characteristics of the scintillator panel can be changed easily by altering the color material at the time of manufacture. This greatly reduces the cost incurred when newly manufacturing a scintillator panel having a different characteristic.

The scintillator panel may further comprise a first organic film formed between the scintillator and the resin layer. Even when moisture enters the resin layer in such a structure, the first organic film can function as a moisture-proof protective film, so as to inhibit the moisture from entering the scintillator, whereby performances of the scintillator can be kept from being worsened by the moisture entering there. This contributes to extending the life of the scintillator panel.

The scintillator panel may further comprise a second organic film formed on an opposite side of the resin layer from the scintillator. In such a structure, the second organic film can prevent the resin layer from peeling off. By functioning as a moisture-proof protective film, it can also inhibit moisture from entering the scintillator and resin layer from the outside, so that performances of the scintillator can be kept from being worsened by the moisture entering there, whereby the scintillator panel can extend its life.

The scintillator panel may further comprise a first organic film formed between the scintillator and the resin layer and a second organic film formed on the resin layer, the first and second organic films being in close contact with each other on the outside of an outer periphery of the resin layer. In such a structure, the first and second organic films can shield the resin layer from outside air, so as to prevent moisture from entering the resin layer. This can keep performances of the resin layer from being worsened by the moisture entering there, whereby the scintillator panel can extend its life.

In the scintillator panel, the first organic film may have a thickness smaller than that of the second organic film. In this case, thinning the first organic film can inhibit the light generated by the scintillator from being scattered within the first organic film and then emitted from the scintillator panel. Therefore, this scintillator panel can restrain the scattered light from being issued therefrom and thus can improve its performances.

In the scintillator panel, the first organic film may have a thickness of 0.05 µm to 5 µm at a monomolecular film level, while the second organic film may have a thickness of 7 µm to 2000 µm. The thickness of the second organic film may also be 10 µm to 30 µm.

In the scintillator panel, the first organic film may have an outer periphery reaching a side face of the fiber optics plate. In this case, the first organic film covers a side face of the scintillator on the fiber optics plate and thus can favorably inhibit moisture from entering the scintillator from the outside, whereby the scintillator panel can further extend its life.

In the scintillator panel, the resin layer may have an outer periphery coinciding with an outer edge of the entrance surface. In this case, the outer periphery of the resin layer does not project from the entrance surface of the scintillator, so that a region where the first and second organic films can come into close contact with each other can be kept from being narrowed by the resin layer projecting from the entrance surface. This can sufficiently secure the region where the first and second organic films can come into close contact with each other, thereby reliably protecting the resin layer.

In the scintillator panel, the outer periphery of the resin layer may be located on a surface of the scintillator substantially orthogonal to the entrance surface. In this case, the resin layer is formed so as to be routed to the surface of the scintillator substantially orthogonal to the entrance surface, whereby the light generated within the scintillator and then directed to the substantially orthogonal surface, if any, can be reflected or absorbed by the resin layer. Since the outer periphery of the resin layer does not reach the fiber optics plate, the region where the first and second organic films can come into close contact with each other can be secured at the outer periphery of the fiber optics plate, whereby the resin layer can be protected with high reliability.

The radiation image sensor comprises a scintillator having an entrance surface for a radiation; an image pickup device, arranged on an opposite side of the scintillator from the entrance surface, for capturing an image of light generated by the scintillator; and a resin layer, formed from a resin containing a color material on the entrance surface side of the scintillator, for performing at least one of absorption and reflection of the light generated by the scintillator.

This radiation image sensor can change the light reflectance and absorptance in the resin layer by varying the color material constituting the resin layer, so that characteristics of the radiation image sensor can be changed easily by altering the color material at the time of manufacture. This greatly reduces the cost incurred when newly manufacturing a radiation image sensor panel having a different characteristic.

The radiation image sensor may further comprise a first organic film formed between the scintillator and the resin layer. Even when moisture enters the resin layer in such a structure, the first organic film can function as a moisture-proof protective film, so as to inhibit the moisture from entering the scintillator, whereby performances of the scintillator can be kept from being worsened by the moisture entering there. This contributes to extending the life of the radiation image sensor.

The radiation image sensor may further comprise a second organic film formed on an opposite side of the resin layer from the scintillator. In such a structure, the second organic film can prevent the resin layer from peeling off. By functioning as a moisture-proof protective film, it can also inhibit moisture from entering the scintillator and resin layer from the outside, whereby performances of the scintillator can be kept from being worsened by the moisture entering there, and the radiation image sensor can extend its life.

The radiation image sensor may further comprise a first organic film formed between the scintillator and the resin layer and a second organic film formed on an opposite side of the resin layer from the scintillator, the first and second organic films being in close contact with each other on the outside of an outer periphery of the resin layer. In such a structure, the first and second organic films can shield the resin layer from outside air, so as to prevent moisture from entering the resin layer. This can keep performances of the resin layer from being worsened by the moisture entering there, whereby the radiation image sensor can extend its life.

In the radiation image sensor, the first organic film may have a thickness smaller than that of the second organic film. In this case, thinning the first organic film can inhibit the light generated by the scintillator from being scattered within the first organic film and then detected by the radiation image sensor. Therefore, this radiation image sensor can restrain the light scattered within the first organic film from being detected by the radiation image sensor, whereby the radiation image sensor can improve its performances.

In the radiation image sensor, the first organic film may have a thickness of 0.05 μm to 5 μm at a monomolecular film level, while the second organic film may have a thickness of 7 μm to 2000 μm. The thickness of the second organic film may also be 10 μm to 30 μm.

In the radiation image sensor, the first organic film may have an outer periphery reaching an outer surface of the image pickup device. In this case, the first organic film covers a side face of the scintillator on the fiber optics plate and thus can favorably inhibit moisture from entering the scintillator from the outside, whereby the radiation image sensor can further extend its life.

In the radiation image sensor, the resin layer may have an outer periphery coinciding with an outer edge of the entrance surface. In this case, the outer periphery of the resin layer does not project from the entrance surface of the scintillator, so that a region where the first and second organic films can come into close contact with each other can be kept from being narrowed by the resin layer projecting from the entrance surface. This can sufficiently secure the region where the first and second organic films can come into close contact with each other, thereby reliably protecting the resin layer.

In the radiation image sensor, the outer periphery of the resin layer may be located on a surface of the scintillator substantially orthogonal to the entrance surface. In this case, the resin layer is formed so as to be routed to the surface of the scintillator substantially orthogonal to the entrance surface, whereby the light generated within the scintillator and then directed to the substantially orthogonal surface, if any, can be reflected or absorbed by the resin layer. Projecting the outer peripheries of the first and second organic films from the outer periphery of the resin layer can secure the region where the first and second organic films can come into close contact with each other, whereby the resin layer can be protected with high reliability.

Advantageous Effects of Invention

The present invention can easily change characteristics of the scintillator panel and radiation image sensor at the time of manufacture.

DESCRIPTION OF EMBODIMENTS

Figure 1:
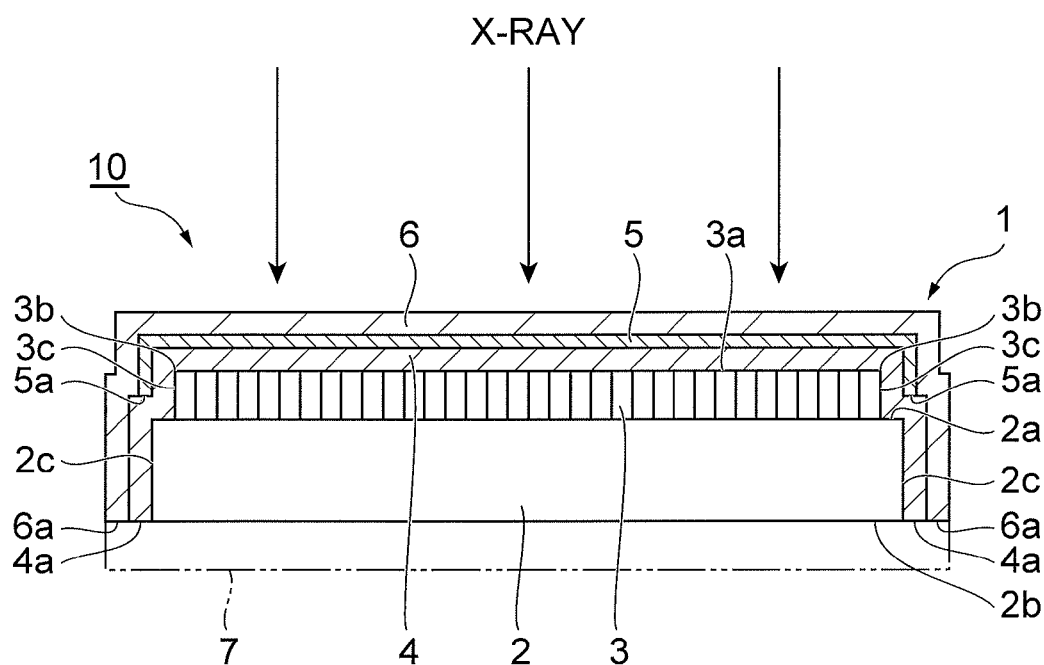
FIG. 1 is a sectional view illustrating a first embodiment of the scintillator panel and radiation image sensor in accordance with the present invention.

In the following, preferred embodiments of the present invention will be explained in detail with reference to the drawings. In the drawings, the same or equivalent parts will be referred to with the same signs while omitting their overlapping descriptions. Sizes, forms, and dimensional relationships in the drawings do not always coincide with those in practice.

First Embodiment

As illustrated in FIG. 1, the scintillator panel 1 in accordance with the first embodiment converts a radiation such as an X-ray into scintillation light and constitutes a radiation image sensor 10 together with an image pickup device 7 which can capture an image of the scintillation light. As the image pickup device 7 constituting the radiation image sensor 10, a combination of a thin-film transistor with a photodiode array, a CCD image sensor, or the like is employed.

The scintillator panel 1 is constituted by a fiber optics plate (hereinafter referred to as FOP) 2, a scintillator 3, a first organic film 4 functioning as a moisture-proof protective film, a resin layer 5, and a second organic film 6 functioning as a moisture-proof protective film. The FOP 2 is one in which a number of optical fibers are bundled together, so as to be formed into a plate. The scintillator 3 is formed on one main face 2a of the FOP 2. The image pickup device 7 is disposed on the other main face 2b of the FOP 2. The FOP 2 propagates the light incident on the main face 2a from the scintillator 3 side to the main face 2b side, i.e., to the image pickup device 7 side.

The scintillator 3 is a phosphor made of acicular crystals of CsI (cesium iodide) doped with Tl (thallium) and converts the radiation incident thereon into scintillation light. The scintillator 3 is formed on one main face 2a of the FOP 2. An entrance surface 3a on which the radiation is incident is formed on the opposite side of the scintillator 3 from the FOP 2. The scintillator 3 has a substantially rectangular parallelepiped form with a side face 3c orthogonal to the entrance surface 3a.

The FOP 2 and scintillator 3 are covered with the first organic film 4 made of poly(p-xylylene). The first organic film 4 is used for preventing moisture from entering the scintillator 3. The first organic film 4 covers the entrance surface 3a and side face 3c of the scintillator 3 and the FOP 2 excluding the other main face 2b. The first organic film 4 has an outer periphery 4a reaching the side face 2c of the FOP 2. The outer periphery 4a of the first organic film 4 is located within the same plane as the main face 2b of the FOP 2.

The first organic film may have a thickness of 0.05 μm to 5 μm. When the thickness of the first organic film is less than 0.05 μm, the surface for forming the resin layer 5 is hard to keep its evenness. When the thickness of the first organic film exceeds 5 μm, on the other hand, scattering and the like are easier to occur in the scintillation light passing through the first organic film, which makes it more likely for the scintillator panel 1 to lower its performances.

The resin layer 5 functions as a light absorbing layer for absorbing the scintillation light generated by the scintillator 3 or a light reflecting layer for reflecting the scintillation light. The resin layer 5 is formed such as to cover the entrance surface 3a of the scintillator 3 on the first organic film 4. The resin layer 5 is formed so as to be routed to the side face 3c beyond the entrance surface 3a of the scintillator 3, while its outer periphery 5a is located on the side face 3c of the scintillator 3. The resin layer 5 is formed from a resin containing a color material and has a color determined by the kind of the color material. Changing the kind of the color material can alter the color of the resin layer 5, i.e., the light absorptance and reflectance of the resin layer 5.

The second organic film 6 for protecting the resin layer 5 is formed thereon. The second organic film 6 is a poly(p-xylylene) film as with the first organic film 4 and covers the outside of the resin layer 5 and first organic film 4. The second organic film 6 has an outer periphery 6a reaching the side face 2c of the FOP 2. The outer periphery 6a of the second organic film 6 is located within the same plane as the main face 2b of the FOP 2.

The second organic film 6 is formed thicker than the first organic film 4. The second organic film may have a thickness of 7 μm to 2000 μm. The thickness of the second organic film may also be 10 μm to 30 μm. When the thickness of the second organic film 6 is less than 7 μm, the scintillator panel 1 is hard to secure its moisture resistance. While the thickness of the second organic film 6 is not restricted in particular as long as the X-ray transmittance is not lowered thereby, the upper limit is 2000 μm from the viewpoints of manufacture and use. The range of 10 μm to 30 μm is derived from such points as improvement in moisture resistance, X-ray transmittance, and manufacture. Since the second organic film mainly functions as a moisture-proof protective film, it will be sufficient if a uniform film is formed as a whole even when pinholes and the like exist in the first organic film, whereby the moisture resistance is improved by the synergy between the first and second organic films even when the former includes pinholes and the like as compared with a single-layer organic film.

The first and second organic films 4, 6 hold the resin layer 5 therebetween and are in close contact with each other on the outside of the outer periphery 5a of the resin layer 5. In other words, the first and second organic films 4, 6 shield the resin layer 5 from outside air, so as to seal it hermetically. Only the other main face 2b of the FOP 2 is exposed to the outside without being covered with any of the first and second organic films 4, 6.

When thus constructed scintillator panel 1 in accordance with the first embodiment is irradiated with a radiation such as an X-ray from thereabove, the radiation is converted into scintillation light within the scintillator 3, and the resulting scintillation light is made incident on the main face 2a of the FOP 2. The light incident on the main face 2a propagates through the FOP 2 and then is emitted from the other main face 2b. The light emitted from the other main face 2b is captured by the image pickup device 7, whereby the radiation is detected by the radiation image sensor 10.

The resin layer 5 in the scintillator panel 1 absorbs or reflects the light advancing to the resin layer 5 (on the side opposite from the FOP 2) in the scintillation light generated in the scintillator 3. When the resin layer 5 absorbs the scintillation light, crosstalk components decrease in the scintillation light, whereby the resolution of radiation images obtained by the radiation image sensor can be improved. When the resin layer 5 reflects the scintillation light to the FOP 2, the optical output emitted from the FOP 2 to the outside can be increased.

A method of manufacturing the scintillator panel 1 in accordance with the first embodiment will now be explained with reference to FIG. 1.

First, the FOP 2 is heated to 100° C. Then, acicular crystals of CsI doped with Tl are grown by vapor deposition on the main face 2a of the FOP 2, so as to form the scintillator 3.

Thereafter, the FOP 2 formed with the scintillator 3 is put into a vapor deposition chamber of a CVD (Chemical Vapor Deposition) system. In the vapor chamber, the first organic film 4 is formed by a CVD process in which the FOP 2 is exposed to a vapor obtained by subliming materials for poly(p-xylylene). The first organic film 4 is formed such as to cover the scintillator 3 and the side face 2c and main face 2a of the FOP 2.

Subsequently, a paint made of a resin containing a color material having a specific color is applied onto the FOP 2 formed with the first organic film 4, so as to form the resin layer 5. Usable as such a paint are typical ones in which a resin serving as a binder is dissolved in an organic solvent or the like and mixed with a pigment as a color material to become a coloring component. Various types of paints such as enamel, lacquer, and urethane can be utilized. As a method of applying the paint, spray coating in which the paint is sprayed like a mist, brushing, dip coating, spin coating, or the like is used. Here, the light reflectance and absorptance in the resin layer 5 can be changed by varying the color of the paint (color of the color material) used for forming the resin layer 5.

Thereafter, the FOP 2 formed with the resin layer 5 is put into the vapor deposition chamber of the CVD system again, so as to form the second organic film 6 by the CVD method as with the first organic film 4. The second organic film 6 is formed such as to cover the resin layer 5 and the first organic film 4. This step causes the first and second organic films 4, 6 to hold the resin layer 5 therebetween, so as to seal it hermetically. The foregoing steps manufacture the scintillator panel 1 in accordance with the first embodiment.

Figure 2:
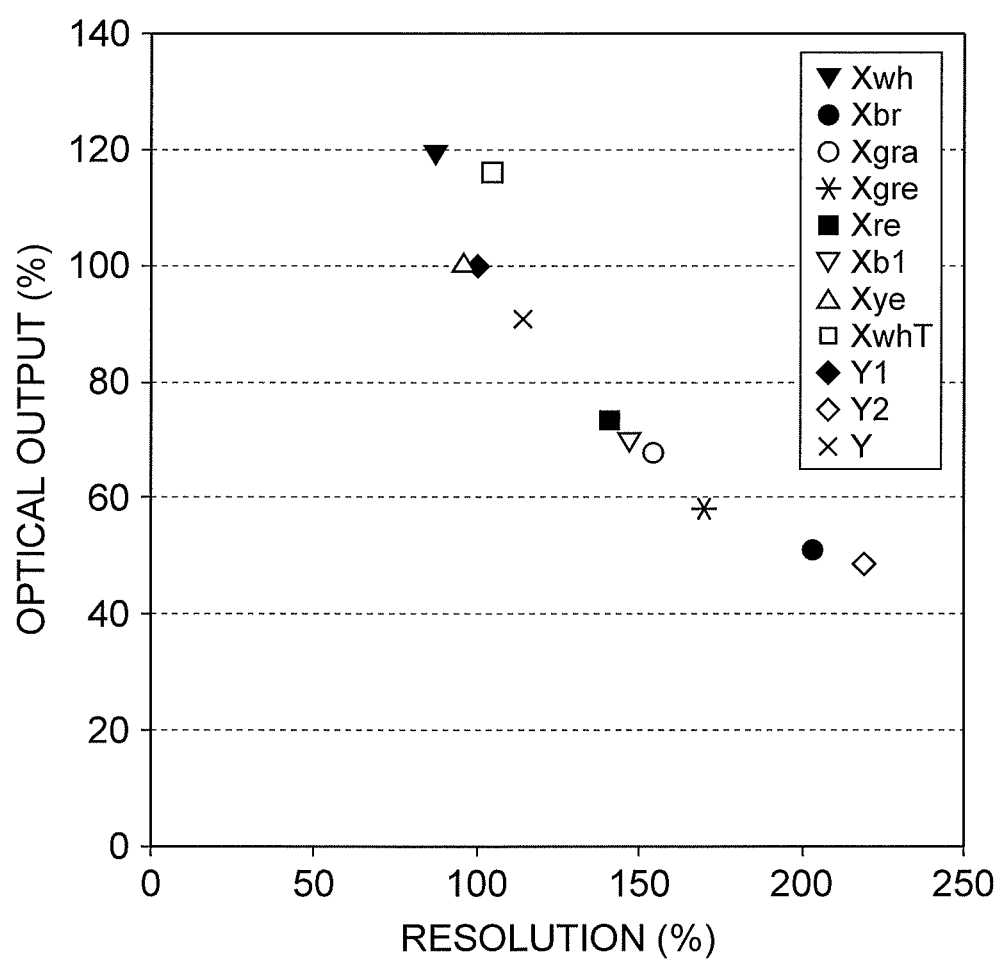
FIG. 2 is a graph illustrating the relationship between the resolution and optical output of the scintillator panel and the color of its resin layer.

The relationship between the optical output and resolution of the scintillator panel 1 in accordance with the first embodiment and the color of the resin layer 5 will now be explained. The inventors irradiated a plurality of scintillator panels having different colors in their resin layers 5 with an X-ray and measured the optical output and resolution of each scintillator panel. The following are X-ray irradiation conditions at the time of measurement:

(A) X-ray tube voltage: 30 kV
(B) X-ray tube current: 1.5 mA
(C) Aluminum filter thickness: 0.3 mm FIG. 2 illustrates the results of measurement of the optical output and resolution of the scintillator panel 1 under the foregoing conditions. The abscissa and ordinate of FIG. 2 indicate the resolution and optical output, respectively. The resolution and optical output of the scintillator panel 1 were relatively evaluated with reference to a scintillator panel (hereinafter referred to as "type A"; specifically, a structure in which an FOP, a scintillator, a first protective film, an aluminum reflective film, and a second protective film were arranged in this order as illustrated in FIG. 1 of International Publication WO99/66350) in which a reflective film made of Al (aluminum) was formed on the radiation entrance side of the scintillator so as to enhance its luminance characteristic. In FIG. 2, Xwh, Xbr, Xgra, Xgre, Xre, Xbl, and Xye represent characteristics of scintillator panels 1 whose resin layers 5 were formed by white, black, gray, green, red, blue, and yellow paints, respectively. The first and second organic layers 4, 6 have the same thickness in Xwh, Xbr, Xgra, Xgre, Xre, Xbl, and Xye. XwhT indicates the characteristic of a scintillator panel in which only the thickness of the first organic film 4 differs from that of Xwh. The thickness of the first organic film 4 in XwhT is ⅕ that of each of the first and second organic films 2, 6 in Xwh.

In FIG. 2, Y, Y1, and Y2 are comparative examples structurally different from the scintillator panel 1 in accordance with the first embodiment. Y represents the characteristic of a scintillator panel constituted by only the FOP 2, scintillator 3, and first organic film 4. Y1 represents the characteristic of the above-mentioned type A. Y2 represents the characteristic of a scintillator panel (hereinafter referred to as "type B"; specifically, a structure in which an FOP, a scintillator, an absorptive metal film, and a protective film were arranged in this order) in which, unlike the type A, the resolution characteristic was enhanced without forming the reflective film.

As illustrated in FIG. 2, scintillator panels 1 having various kinds of optical output and resolution were obtained by varying the color of the resin layer 5. The scintillator panel 1 using the white paint exhibited a characteristic having higher optical output and lower resolution as compared with the other scintillator panels, while the scintillator panel 1 using the black paint exhibited a characteristic having lower optical output and higher resolution as compared with the other scintillator panels Operations and effects of the scintillator panel 1 in accordance with the first embodiment will now be explained.

The scintillator panel 1 in accordance with the first embodiment can change the light reflectance and absorptance in the resin layer 5 by varying the color material constituting the resin layer 5, so that characteristics of the scintillator panel 1 can be changed easily by altering the color material used for manufacture. This greatly reduces the cost incurred when newly manufacturing a scintillator panel having a different characteristic.

In this scintillator panel 1, the second organic film 6 can prevent the resin layer 5 from peeling off. It can also restrain moisture from entering the scintillator 3 and resin layer 5 from the outside. Even when moisture enters the resin layer 5, the first organic film 4 can inhibit the moisture from entering the scintillator 3. Therefore, this scintillator panel 1 can keep performances of the scintillator 3 and resin layer 5 from being worsened by the moisture entering there and thus can extend its life.

By having a double protective film constructed by the first and second organic films 4, 6, the scintillator panel 1 can improve its moisture resistance, i.e., extend its life. By having the two protective films 4, 6, it can also make the first organic film 4 thinner than in the case provided with the first organic film 4 alone, while securing the moisture resistance. Thinning the first organic film 4 can inhibit the light generated by the scintillator 3 from being scattered within the first organic film 4 and then emitted from the scintillator panel 1. Therefore, this scintillator panel 1 can restrain the scattered light from being issued therefrom, while securing the moisture resistance, and thus can improve its performances.

In the scintillator panel 1, the outer periphery of the first organic film 4 reaches the side face 2c of the FOP 2, so that the side face 3c of the scintillator 3 is also covered with the first organic film 4, which can favorably inhibit moisture from entering the scintillator 3 from the outside. The first and second organic films 4, 6 are in close contact with each other on the outside of the outer periphery 5a of the resin layer 5, so as to shield the resin layer 5 from outside air and seal it hermetically, which can securely prevent moisture from entering the resin layer 5. Since the resin layer 5 is formed so as to be routed to the side face 3c of the scintillator 3 substantially orthogonal to the entrance surface 3a thereof, the light generated within the scintillator 3 and then directed to the side face 3c, if any, can be reflected or absorbed by the resin layer 5. Since the outer periphery 5a of the resin layer 5 is located on the side face 3c of the scintillator 3 without reaching the FOP 2, the region where the first and second organic films 4, 6 come into close contact with each other can be secured on the side face 2c of the FOP 2, whereby the resin layer 5 can be protected with high reliability. This contributes to extending the life of the scintillator panel 1.

Second Embodiment

Figure 3:
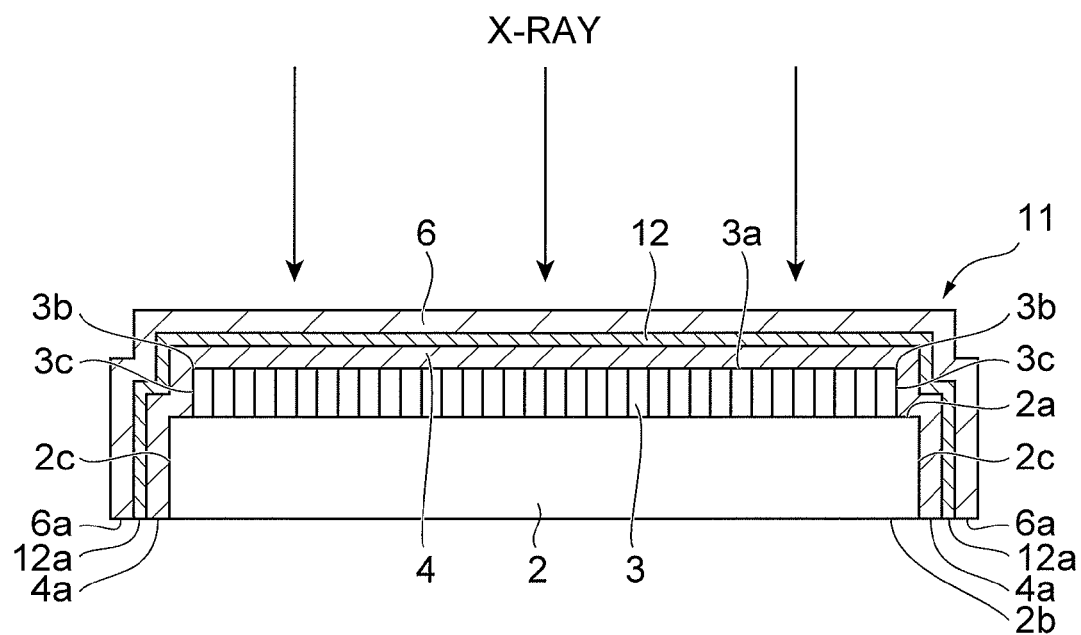
FIG. 3 is a sectional view illustrating a second embodiment of the scintillator panel in accordance with the present invention.

As illustrated in FIG. 3, the scintillator panel 11 in accordance with the second embodiment differs from the scintillator panel 1 in accordance with the first embodiment in the form of its resin layer 12. That is, the resin layer 12 is formed so as to cover the side face 2c of the FOP 2 along the first organic film 4, as well as the scintillator 3. The resin layer 12 is not hermetically sealed with the first and second organic films 4, 6, but has an outer periphery 12a exposed to the outside.

Thus constructed scintillator panel 11 can achieve the same effects as those of the scintillator panel 1 in accordance with the first embodiment except that there is a fear of moisture entering the resin layer 12. The scintillator panel 11 may take measures to prevent the moisture from entering the resin layer 12, e.g., by changing the resin contained in the paint to a fluororesin or silicone resin with low hygroscopicity.

Figure 4:
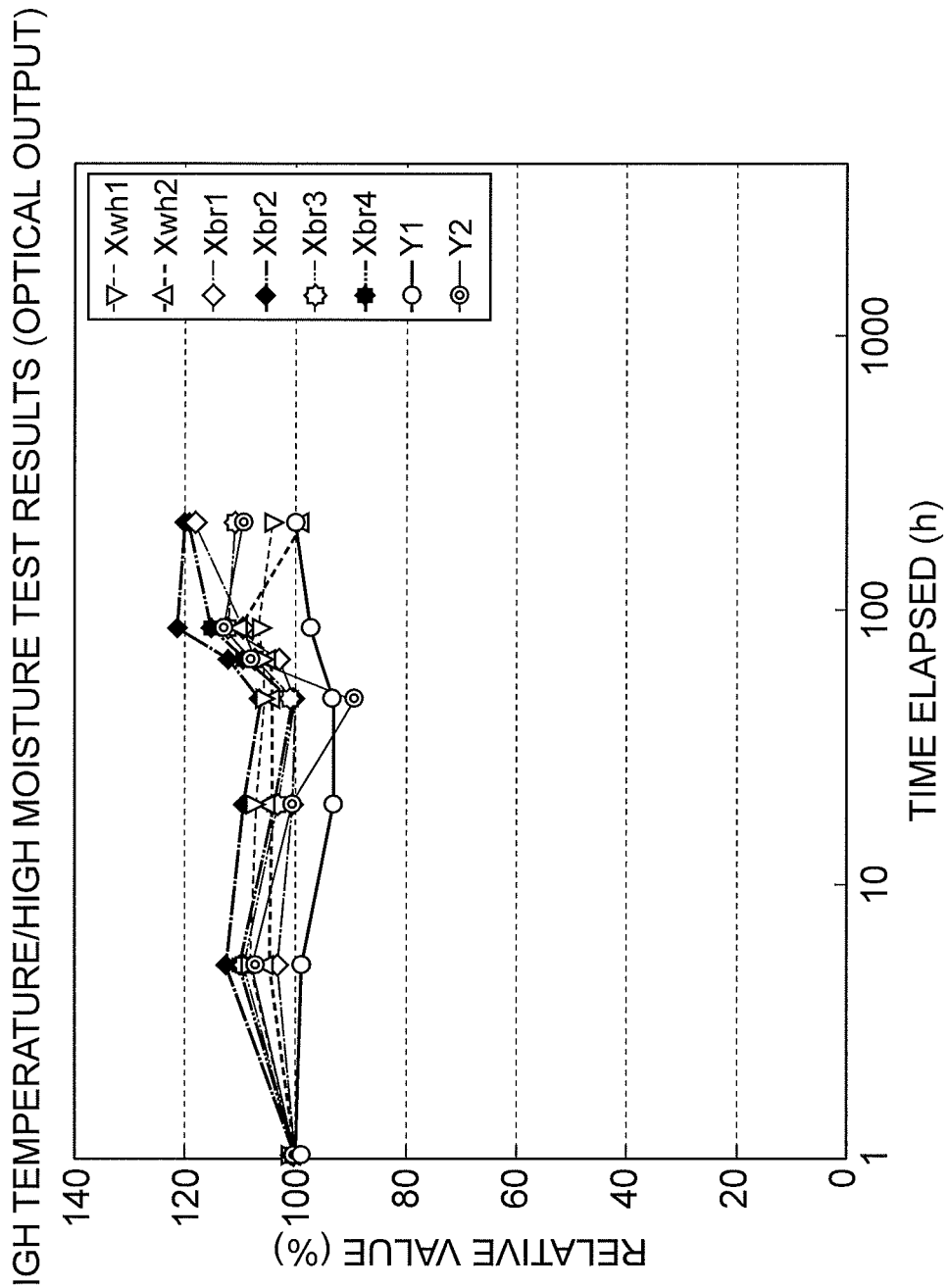
FIG. 4 is a graph illustrating the relationship between the optical output life characteristic of the scintillator panel and the color of its resin layer.
Figure 5:
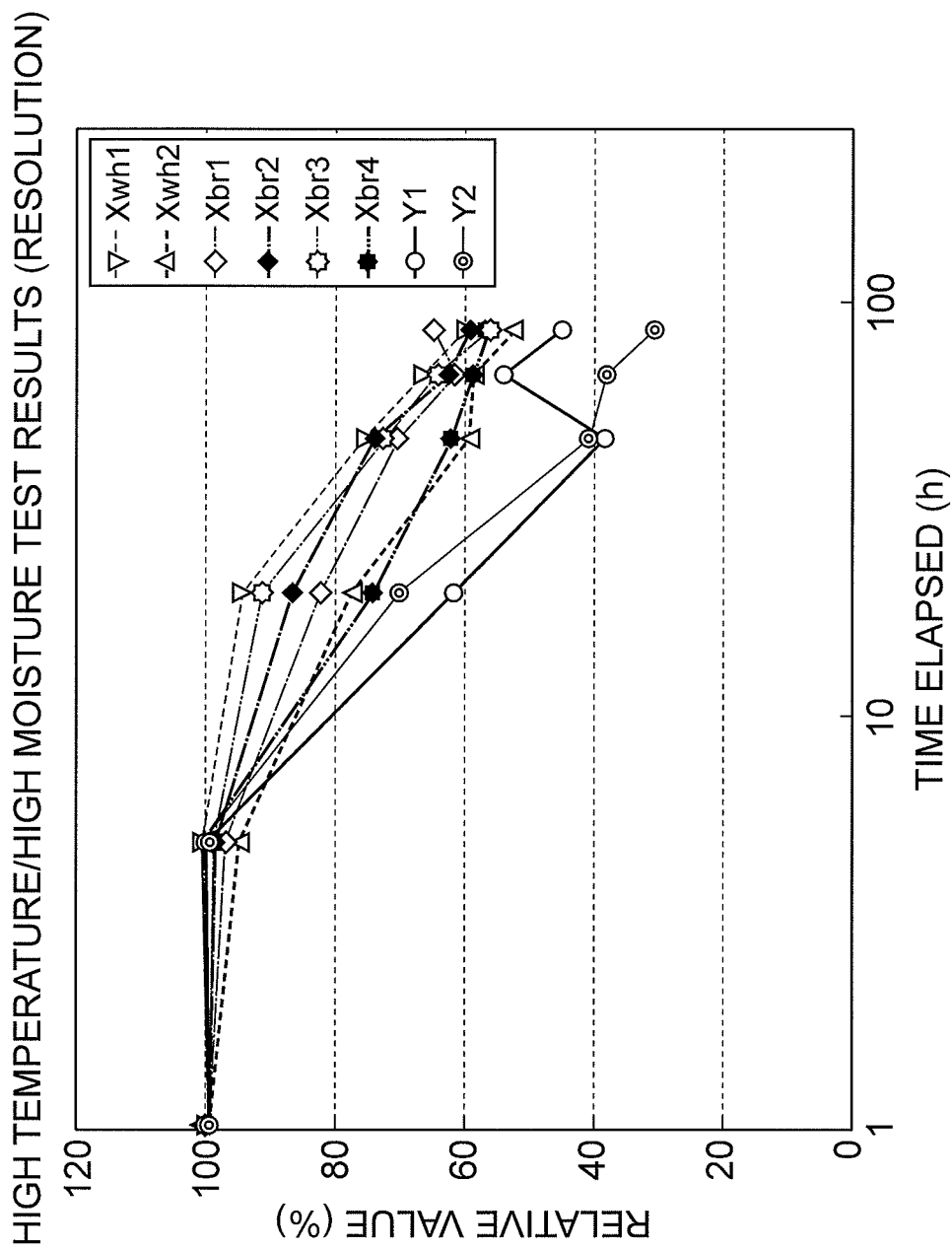
FIG. 5 is a graph illustrating the relationship between the resolution life characteristic of the scintillator panel and the color of its resin layer.

The relationship between the life characteristic (resistance to a high-temperature, high-humidity environment) and the color of the resin layer in the scintillator panels in accordance with the first and second embodiments set forth in the foregoing will now be explained. The inventors placed scintillator panels to be tested in an environment at a temperature of 50° C. and a humidity of 90%, and measured their changes in optical output and resolution with time. FIGS. 4 and 5 illustrate the measurement results. FIG. 4 is a graph representing the relationship between the life characteristic of the optical output of the scintillator panel and the color of the resin layer. FIG. 5 is a graph representing the relationship between the life characteristic of the resolution of the scintillator panel and the color of the resin layer. In FIGS. 4 and 5, the optical output and resolution are expressed by relative values, while their initial values before starting the test are taken as 100.

In each of FIGS. 4 and 5, Xwh1 represents the characteristic of the scintillator panel 1 in accordance with the first embodiment in which the resin layer 5 is formed by a white paint, while Xwh2 represents the characteristic of the scintillator panel 11 in accordance with the second embodiment in which the resin layer 12 is formed by the white paint. Xbr1 represents the characteristic of the scintillator panel 1 in accordance with the first embodiment in which the resin layer 5 is formed by a black paint, while Xwh2 represents the characteristic of the scintillator panel 11 in accordance with the second embodiment in which the resin layer 12 is formed by the black paint. Xbr3 represents the characteristic of the scintillator panel 1 in accordance with the first embodiment in which the resin layer 5 is formed with the black paint, while a double layer of protective films is further formed from poly(p-xylylene). Similarly, Xbr4 represents the characteristic of the scintillator panel 11 in accordance with the second embodiment in which the resin layer 12 is formed with the black paint, while a double layer of protective films is further formed from poly(p-xylylene). Y1 and Y2 are the above-mentioned types A and B, respectively. Each of them represents the characteristic of a scintillator panel using an Al film in place of the resin layer.

As illustrated in FIG. 4, there was no remarkable difference in the life characteristic of optical output between the scintillator panels 1, 11 in accordance with the first and second embodiments. The change with time appeared more greatly when using the black paint (Xbr1, Xbr2) than when using the white paint (Xwh1, Xwh2) in both of the scintillator panels in accordance with the first and second embodiments. The optical output of each scintillator panel tended to increase slightly with time except for the characteristics Y1, Y2 of the scintillator panels of types A and B.

When using the white paint, as illustrated in FIG. 5, the life characteristic of resolution was lower in the scintillator panel 11 in accordance with the second embodiment (Xwh2) than in the scintillator panel 1 in accordance with the first embodiment (Xwh1), so that the resolution greatly decreased with time in Xwh2. When using the black paint, on the other hand, there was no remarkable difference between the scintillator panels 1, 11 in accordance with the first and second embodiments. In the scintillator panel 1 in accordance with the first embodiment, the resolution decreased faster when using the black paint (Xbr1) than when using the while paint (Xwh1). In the scintillator panel 11 in accordance with the second embodiment, in contrast to the first embodiment, the resolution decreased faster when using the white paint (Xwh2) than when using the black paint (Xbr2).

In the scintillator panel 1 in accordance with the first embodiment, adding the protective film (Xbr3) suppressed the decrease in resolution and improved the life characteristic as compared with the case without the protective film (Xbr1). In the scintillator panel 11 in accordance with the second embodiment, on the other hand, the decrease in resolution was less in the case adding no protective film (Xbr4) than in the case adding the protective film (Xbr2). Each of the scintillator panels belonging to the present invention yielded a higher resolution life characteristic than the characteristics Y1, Y2 of the scintillator panels of types A and B.

Each of the scintillator panels in accordance with the first and second embodiments explained in the foregoing employs a resin layer formed from a paint (a resin containing a color material) as a light absorbing or reflecting layer instead of a metal film (reflective or absorptive metal film). This can keep CsI constituting the scintillator 3 and Al from reacting with each other and thereby deteriorating performances of the scintillator panel, whereby the scintillator panel 1 can extend its life.

Third Embodiment

Figure 6:
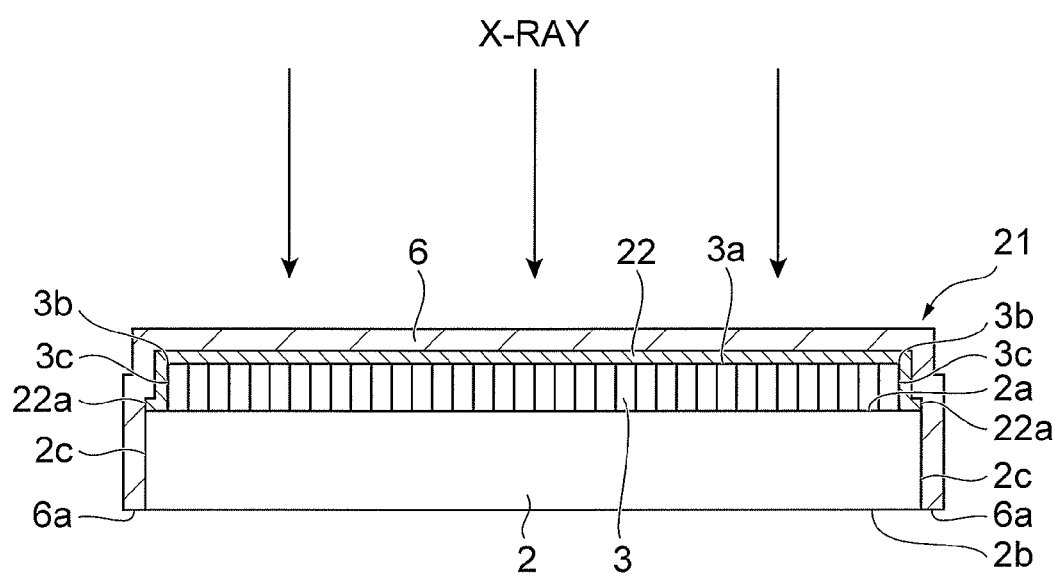
FIG. 6 is a sectional view illustrating a third embodiment of the scintillator panel in accordance with the present invention.

As illustrated in FIG. 6, the scintillator panel 21 in accordance with the third embodiment differs from the scintillator panel 1 in accordance with the first embodiment in that its resin layer 22 is directly formed on the scintillator 3 without the first organic film 4. That is, the resin layer 22 is formed by directly applying a paint having a specific color to the entrance surface 3a and side face 3c of the scintillator 3, whereby only the second organic film 6 serves as a protective film covering the scintillator 3 and FOP 2.

Thus constructed scintillator panel 21 in accordance with the third embodiment can also achieve the same operations and effects as those of the scintillator panel 1 in accordance with the first embodiment. Since the step of forming the first organic film 4 is unnecessary, it can reduce the time and cost required for manufacture.

Fourth Embodiment

Figure 7:
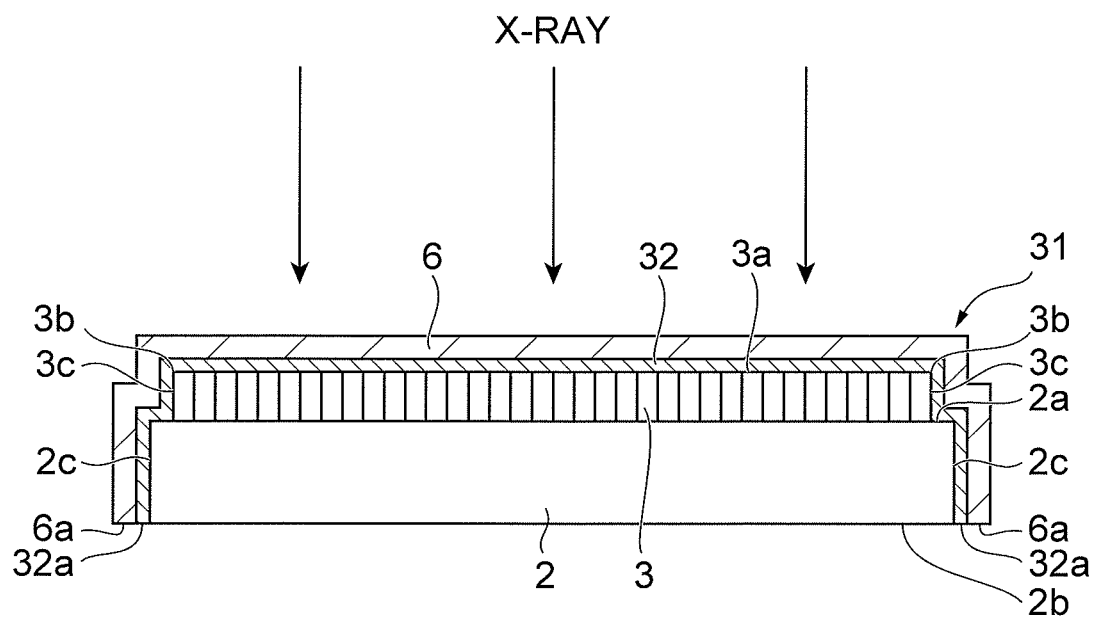
FIG. 7 is a sectional view illustrating a fourth embodiment of the scintillator panel in accordance with the present invention.

As illustrated in FIG. 7, the scintillator panel 31 in accordance with the fourth embodiment differs from the scintillator panel 11 in accordance with the second embodiment in that its resin layer 32 is directly formed on the scintillator 3 without the first organic film 4. That is, the resin layer 22 is formed by directly applying a paint having a specific color onto the scintillator 3, whereby only the second organic film 6 serves as a protective film covering the scintillator 3. As in the scintillator panel 11 in accordance with the second embodiment, the outer periphery 32a of the resin layer 32 is exposed to the outside.

Thus constructed scintillator panel 31 in accordance with the fourth embodiment can also achieve the same operations and effects as those of the scintillator panel 11 in accordance with the second embodiment. Since the step of forming the first organic film 4 is unnecessary, it can reduce the time and cost required for manufacture as with the scintillator panel 21 in accordance with the third embodiment.

The present invention is not limited to the above-mentioned embodiments.

Figure 8:
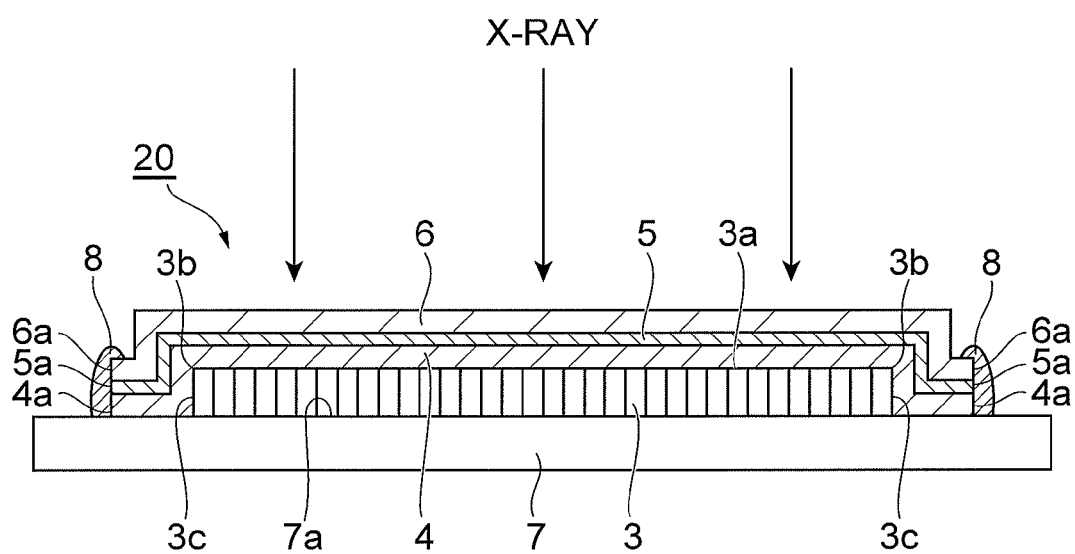
FIG. 8 is a sectional view illustrating another embodiment of the radiation image sensor in accordance with the present invention.

FIG. 8 is a sectional view illustrating the radiation image sensor 20 in accordance with another embodiment. The radiation image sensor 20 illustrated in FIG. 8 mainly differs from the radiation image sensor 10 in accordance with the first embodiment in that it does not include the FOP 2. That is, in the radiation image sensor 20, the scintillator 3 is vapor-deposited on a light receiving surface (outer surface) 7a of the image pickup device 7 instead of the main face 2a of the FOP 2. A passivation film made of silicon nitride or silicon oxide may be formed between the light receiving surface 7a of the image pickup device 7 and the scintillator 3.

The scintillator 3 is covered with the first organic film 4 functioning as a moisture-proof protective film. The first organic film 4 differs from that in the first embodiment only in its form. The first organic film 4 covers the entrance surface 3a and side face 3c of the scintillator 3. The outer periphery side of the first organic film 4 bends laterally of the scintillator 3 along the light receiving surface 7a of the image pickup device 7. The outer periphery of the first organic film 4 is located on the light receiving surface 7a of the image pickup device 7. In the image pickup device 7, an outer peripheral part not covered with the first organic film 4 is formed with a bonding pad for electrically connecting with the outside.

The resin layer 5 is formed on the first organic film 4. The resin layer 5 also differs from that in the first embodiment only in its form. The outer periphery side of the resin layer 5 bends laterally of the scintillator 3 along the light receiving surface 7a of the image pickup device 7. The outer periphery 5a of the resin layer 5 coincides with the outer periphery 4a of the first organic film 4.

The second organic film 6 functioning as a moisture-proof protective film is formed on the resin layer 5. The second organic film 6 also differs from that in the first embodiment only in its form. The outer periphery side of the second organic film 6 bends laterally of the scintillator 3 along the light receiving surface 7a of the image pickup device 7. The outer periphery 6a of the second organic film 6 coincides with the outer periphery 4a of the first organic film 4 and the outer periphery 5a of the resin layer 5.

The outer periphery 4a of the first organic film 4, the outer periphery 5a of the resin layer 5, and the outer periphery 6a of the second organic film 6 are covered with a coating resin 8. For example, an acrylic adhesive is used for the coating resin 8.

When thus constructed radiation image sensor 20 is irradiated with a radiation such as an X-ray from above the panel, the radiation is converted into scintillation light within the scintillator 3, and the resulting scintillation light is made incident on the light receiving surface 7a of the image pickup device 7. The light having advanced to the entrance surface 3a side of the scintillator 3 in the scintillation light passes through the first organic film 4, so as to reach the resin layer 5. The resin layer 5 absorbs or reflects the scintillation light. The scintillation light reflected by the resin layer 5 passes through the first organic film 4 and the scintillator 3, so as to be made incident on the light receiving surface 7a of the image pickup device 7. The radiation image sensor 20 detects the radiation according to the scintillation light captured by the image pickup device 7.

The radiation image sensor 20 explained in the foregoing exhibits substantially the same operations and effects as those of the radiation image sensor 10 in accordance with the first embodiment. That is, this radiation image sensor 20 can change the light reflectance and absorptance in the resin layer 5 by varying the color material constituting the resin layer 5, so that characteristics of the radiation image sensor 20 can be changed easily by altering the color material used for manufacture. This greatly reduces the cost incurred when newly manufacturing the radiation image sensor 20 having a different characteristic.

In this radiation image sensor 20, the second organic film 6 can prevent the resin layer 5 from peeling off. It can also restrain moisture from entering the scintillator 3 and resin layer 5 from the outside. Even when moisture enters the resin layer 5, the first organic film 4 can inhibit the moisture from entering the scintillator 3. Therefore, the radiation image sensor 20 can keep performances of the scintillator 3 and resin layer 5 from being worsened by the moisture entering there and thus can extend its life.

By having a double protective film constructed by the first and second organic films 4, 6, the radiation image sensor 20 can improve its moisture resistance, i.e., extend its life. By having the two protective films 4, 6, it can also make the first organic film 4 thinner than in the case provided with the first organic film 4 alone, while securing the moisture resistance. Thinning the first organic film 4 can inhibit the light generated by the scintillator 3 from being scattered within the first organic film 4 and then detected by the radiation image sensor 20. Therefore, this radiation image sensor 20 can restrain the light scattered within the first organic film 4 from being detected, while securing the moisture resistance, and thus can improve its performances.

In the radiation image sensor 20, the outer periphery of the first organic film 4 reaches the light receiving surface 7a of the image pickup device 7, so that the side face 3c of the scintillator 3 is securely covered with the first organic film 4, which can favorably inhibit moisture from entering the scintillator 3 from the outside. The first and second organic films 4, 6 are in close contact with each other on the outside of the outer periphery 5a of the resin layer 5, so as to shield the resin layer 5 from outside air and seal it hermetically, which can securely prevent moisture from entering the resin layer 5. Since the resin layer 5 is formed so as to be routed to the side face 3c of the scintillator 3 substantially orthogonal to the entrance surface 3a thereof, the light generated within the scintillator 3 and then directed to the side face 3c, if any, can be reflected or absorbed by the resin layer 5. The radiation image sensor 20 does not include the FOP 2 and thus can reduce the number of components and its size as compared with the radiation image sensor 10 in accordance with the first embodiment.

In the radiation image sensor 20, the outer periphery 5a of the resin layer 5 may be located on the side face 3c of the scintillator 3. That is, the outer periphery 5a of the resin layer 5 may be located on the side face 3c of the scintillator 3 while interposing the first organic film 4 therebetween without reaching the outer periphery 4a of the first organic film 4 and the outer periphery 6a of the second organic film 6 (see FIG. 1). In this case, the region where the first and second organic films 4, 6 come into close contact with each other can be secured on the outside of the resin layer 5, so that the resin layer 5 can be securely hermetically sealed by the two protective films 4, 6 and protected with high reliability.

In the above-mentioned radiation image sensor 20 and the scintillator panels in accordance with the embodiments, the outer periphery 5a of the resin layer 5 may coincide with the outer edge 3b of the entrance surface 3a of the scintillator 3. In this case, the resin layer 5 covers only the entrance surface 3a of the scintillator 3, so that the outer periphery 5a of the resin layer 5 does not project from the entrance surface 3a of the scintillator 3, whereby a region where the first and second organic films 4, 6 can come into close contact with each other can be kept from being narrowed by the resin layer 5 projecting from the entrance surface 3a. This can sufficiently secure the region where the first and second organic films 4, 6 can come into close contact with each other, thereby reliably protecting the resin layer 5.

Not only CsI doped with Tl, but CsI doped with Na (sodium), NaI (sodium iodide) doped with Tl, LiI (lithium iodide) doped with Eu (europium), KI (potassium iodide) doped with Tl, and the like can also be utilized as the scintillator 3.

As the first and second organic films 4, 6, not only poly(p-xylylene) films, but also other xylylene-based films such as those of poly(monochloro-p-xylylene), poly(dichloro-p-xylylene), poly(tetrachloro-p-xylylene), poly(fluoro-p-xylylene), poly(dimethyl-p-xylylene), and poly(diethyl-p-xylylene) can be utilized.

INDUSTRIAL APPLICABILITY

The present invention is employable in scintillator panels and radiation image sensors.

REFERENCE SIGNS LIST 1, 11, 21, 31 . . . scintillator panel; 2 . . . FOP; 3 . . . scintillator; 3a . . . entrance surface; 3b . . . outer edge; 3c . . . side face; 4 . . . first organic film; 4a . . . outer periphery; 5, 12, 22, 32 . . . resin layer; 5a, 12a, 22a, 32a . . . outer periphery; 6 . . . second organic film; 6a . . . outer periphery; 7 . . . image pickup device; 7a . . . light receiving surface (outer surface); 8 . . . coating resin; 10, 20 . . . radiation image sensor

The invention claimed is:

1. A scintillator panel comprising:
a scintillator, made of acicular crystals of CsI doped with a predetermined dopant and having an entrance surface for a radiation;
a fiber optics plate, arranged on an opposite side of the scintillator from the entrance surface, and transmitting light generated by the scintillator;
a resin layer, formed from a resin containing a color material on the entrance surface side of the scintillator, and performing absorption and reflection of the light generated by the scintillator;
a first organic film formed between the scintillator and the resin layer and directly on the scintillator by vapor deposition process; and
a second organic film formed on an opposite side of the resin layer from the scintillator so that the resin layer is sandwiched between the first organic film and the second organic film, wherein
the resin layer is formed by a mint made of the resin containing the color material and applied directly onto the first organic film.

2. A scintillator panel according to claim 1, wherein the first organic film has a thickness smaller than that of the second organic film.

3. A scintillator panel according to claim 2, wherein the first organic film has a thickness of 0.05 μm to 5 μm; and
wherein the second organic film has a thickness of 7 μm to 2000 μm.

4. A scintillator panel according to claim 3, wherein the thickness of the second organic film is 10 μm to 30 μm.

5. A scintillator panel according to claim 1, wherein the first organic film has an outer periphery reaching a side face of the fiber optics plate.

6. A scintillator panel according to claim 1, wherein the resin layer has an outer periphery coinciding with an outer edge of the entrance surface.

7. A scintillator panel according to claim 1, wherein the resin layer has an outer periphery located on a surface of the scintillator substantially orthogonal to the entrance surface.

8. A radiation image sensor comprising:
a scintillator, made of acicular crystals of CsI doped with a predetermined dopant and having an entrance surface for a radiation;
an image pickup device, arranged on an opposite side of the scintillator from the entrance surface, and capturing an image of light generated by the scintillator;
a resin layer, formed from a resin containing a color material on the entrance surface side of the scintillator, and performing absorption and reflection of the light generated by the scintillator;
a first organic film formed between the scintillator and the resin layer and directly on the scintillator by a vapor deposition process; and
a second organic film formed on an opposite side of the resin layer from the scintillator so that the resin layer is sandwiched between the first organic film and the second organic film, wherein
the resin layer is formed by a paint made of the resin containing the color material and applied directly onto the first organic film.

9. A radiation image sensor according to claim 8, wherein the first organic film has a thickness smaller than that of the second organic film.

10. A radiation image sensor according to claim 9, wherein the first organic film has a thickness of 0.05 μm to 5 μm; and
wherein the second organic film has a thickness of 7 μm to 2000 μm.

11. A radiation image sensor according to claim 10, wherein the thickness of the second organic film is 10 μm to 30 μm.

12. A radiation image sensor according to claim 8, wherein the first organic film has an outer periphery reaching an outer face of the image pickup device.

13. A radiation image sensor according to claim 8, wherein the resin layer has an outer periphery coinciding with an outer edge of the entrance surface.

14. A radiation image sensor according to claim 8, wherein the resin layer has an outer periphery located on a surface of the scintillator substantially orthogonal to the entrance surface.

15. A scintillator panel comprising:
a scintillator, made of acicular crystals of CsI doped with a predetermined dopant and having an entrance surface for a radiation;
a fiber optics plate, arranged on an opposite side of the scintillator from the entrance surface, and transmitting light generated by the scintillator;
a resin layer, formed from a resin containing a color material on the entrance surface side of the scintillator, and performing reflection of the light generated by the scintillator;
a first organic film formed between the scintillator and the resin layer and directly on the scintillator by a vapor deposition process; and
a second organic film formed on an opposite side of the resin layer from the scintillator so that the resin layer is sandwiched between the first organic film and the second organic film, wherein
the resin layer is formed by a paint made of the resin containing the color material and applied directly onto the first organic film.

16. A radiation image sensor comprising:
a scintillator, made of acicular crystals of CsI doped with a predetermined dopant and having an entrance surface for a radiation;
an image pick-up device, arranged on an opposite side of the scintillator from the entrance surface, and capturing an image of light generated by the scintillator;
a resin layer, formed from a resin containing a color material on the entrance surface side of the scintillator, and performing reflection of the light generated by the scintillator;
a first organic film formed between the scintillator and the resin layer and directly on the scintillator by a vapor deposition process; and
a second organic film formed on an opposite side of the resin layer from the scintillator so that the resin layer is sandwiched between the first organic film and the second organic film, wherein
the resin layer is formed by a paint made of the resin containing the color material and applied directly onto the first organic film.

* * * * *